INVENTORS
GEORGE CHEROFF
FREDERICK HOCHBERG
ARNOLD REISMAN
SOL TRIEBWASSER

BY

ATTORNEY

United States Patent Office 3,145,120
Patented Aug. 18, 1964

3,145,120
METHOD FOR CONTROLLING FLUX PRESSURE DURING A SINTERING PROCESS
George Cheroff and Frederick Hochberg, Peekskill, Arnold Reisman, Yorktown Heights, and Sol Triebwasser, Peekskill, N.Y., assignors to International Business Machines Corporation, New York, N.Y., a corporation of New York
Filed Feb. 12, 1962, Ser. No. 172,699
19 Claims. (Cl. 117—201)

This invention relates to a method for controlling the partial pressure of a volatile flux, volatile at the temperature during which a sintering process is to be effected. More particularly, it describes a process for fabricating photoconductor sintered layers which incorporate flux partial pressure control during the sintering cycle.

It has been found in the past that in any sintering process during which a flux is used that if the flux mixed with the sintering material is lost only a partial sintering occurs which results in sintered material having non-reproducible electrical characteristics.

Ordinarily, fluxes are employed to decrease the temperatures necessary for the formation of a liquid phase which enhances and facilitates sintering, grain growth and interparticle connection. In general, fluxes may be used in the sintering of any material. Normally fluxes are used in the sintering of such materials as for example, cadmium selenide or cadmium sulfide, which are semiconductors as well as photoconductors. The fluxes used in the sintering of photoconductor materials are generally of high volatility in the temperature regions at which sintering must be effected. Consequently, relatively large quantities of flux are added to the initial unsintered bulk materials. However, the amounts that can be initially added are distinctly limited or else severe dilution of the photoconductors results and thus the sintered layers are thin and noncontinuous. Although the problem exists regardless of the size of the individual photoconductor element, the problem becomes more acute with decreasing size since the absolute quantity of flux in the original mixture is soon exhausted before effective sintering can occur. Thus the net effect is to yield photoconductor elements with marked non-reproducibility which when part of multiple element devices greatly reduces the device yield since in general, all elements on multiple element devices must fall within the desired specifications. In the past it has been difficult to maintain appropriate flux material vapor pressures of the sintering photoconductor during the latter's heat treatment with the result that the electrical properties of the elements of a multiple element device vary markedly within the device itself and from device to device rendering reproducibility difficult.

The process of the invention controls the flux vapor pressure in the ambient atmosphere of the sintering photoconductor material which in turn markedly affects the electrical and physical properties of the resulting sintering photoconductor. This process automatically maintains the desired flux material vapor pressure over the sintering photoconductor during the latter's heat treatment at all temperatures involved in the temperature sintering cycle, and results in multiple element photoconductor devices whose properties do not vary within the device itself or from device to device. Similar results are obtained with single element photoconductor devices processed in the same manner.

The process of the invention also consists of sintering cadmium selenide in a controlled gaseous atmosphere (oxygen and nitrogen) at a temperature dictated by the phase diagram for the system cadmium selenide-cadmium chloride for a composition where approximately 10–20 mol percent of the cadmium selenide is in a liquid phase.

The incorporation of a precise method of vapor pressure control of the normally volatile flux material during the sintering cycle also maintains the flux concentration close to its initial concentration during the entire sintering cycle.

It is an object of the invention to control the partial pressure of the flux during any sintering process in which a volatile flux is used.

It is another object of the invention to control the flux partial pressure during the fabrication of fluxed sintered layer photoconductors.

It is an object of the invention to control the cadmium halide flux partial pressure during the fabrication of fluxed sintered layer photoconductors.

A further object of the invention is to control the cadmium chloride flux partial pressure used in the fabrication of fluxed cadmium selenide sintered layer photoconductors.

Still another object of the invention is to control the cadmium chloride flux partial pressure used in the fabrication of fluxed cadmium sulfide sintered layer photoconductors.

It is an object of the invention to control the cadmium chloride flux partial pressure used in the fabrication of fluxed solid solutions of cadmium selenide and cadmium sulfide sintered layer photoconductors.

Another object of the invention is to control the cadmium bromide or cadmium iodide flux partial pressure during the fabrication of fluxed sintered layer photoconductors of cadmium selenide or cadmium sulfide or solid solutions of cadmium sulfide and cadmium selenide.

It is another object of the invention to control the temperature range of sintering so as to provide controlled amounts of the liquid phase fluxed photoconductor material during the sintering cycle of the photoconductor sintered layer fabrication process.

A further object of the invention is to control the sintering temperature range of cadmium selenide fluxed by cadmium chloride so as to provide controlled amounts of the liquid phase fluxed photoconductor material during the sintering cycle of the photoconductor sintered layer fabrication process.

Still a further object of the invention is to control the sintering time range for a given temperature cycling of sintering so as to provide uniform controlled grain growth size within the sintered layer photoconductor.

Also an object of the invention is to control the ambient atmosphere other than flux atmosphere so as to enable continuous (self adjusting) vacancy compensation of photoconductor sintered layer at all temperatures encountered during the sintering cycle of the fabricated process.

The foregoing and other objects, features, and advantages of the invention will be apparent from the following more particular description of a proven embodiment of the invention, as illustrated in the accompanying drawings.

All chemically stable compounds are potential fluxes. A flux is hereby defined as a material which in admixture with one or more other materials lowers the temperature at which a liquid phase is formed for any of the individual admixed substances present in the pure state. Aside from the possible action as a controlled source of impurity atoms, the primary functions of a flux are to depress the melting point of the material with which it is admixed.

For example CdSe melts at 1235° C. ±4° C. and by admixing CdSe with CdCl$_2$ a liquid phase will be formed at 522° C., some 700° below the temperature at which a liquid phase will form in pure CdSe. However, all known stable compounds exhibit an increase in vapor pressure with temperature. $CdCl_2$ for example at 25° C. exhibits a vapor pressure of approximately $10^{-7}$ mm. of Hg while at 522° C. it exhibits a vapor pressure of approximately 40 mm. of Hg. Since the formation of a liquid phase in the system $CdSe$—$CdCl_2$ occurs at 522° C. where the vapor pressure of $CdCl_2$ is high, it is evident that the latter will volatilize to an appreciable extent in an open system at a temperature of 522° C. Other fluxes such as for example $CdBr_2$ and $CdI_2$ will behave in a similar manner.

Figure 1:
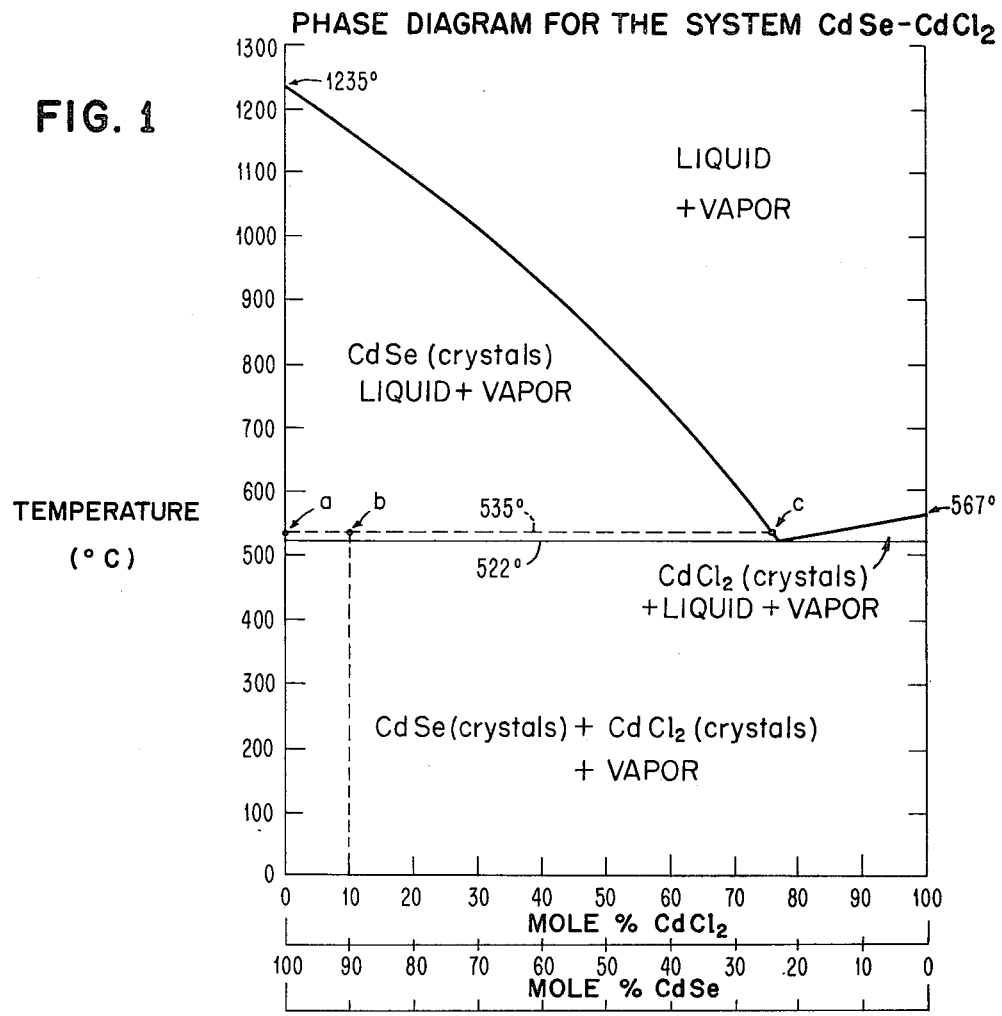
FIGURE 1 is the phase diagram for the system CdSe—CdCl$_2$.

The effects of volatilization of a flux during a sintering process can best be explained by considering the phase diagram of the system $CdSe$—$CdCl_2$ shown in FIGURE 1. This diagram shows the relationship between melting point and composition of the system. The ordinates, of which there are two, are either pure CdSe or pure $CdCl_2$. The first of these (i.e. pure CdSe), melts at 1234° C. and its melting point is depressed to as low as 522° C. by the addition of the flux $CdCl_2$. In fact, at approximately 80 mole percent $CdCl_2$ such a mixture would completely melt at 522° C. At lower $CdCl_2$ concentrations proportionally smaller percentages of the total mixture would melt at 522° C. while the remainder would melt at a higher temperature. The temperature at which complete melting occurs for any specified initial concentration is determined by a line coincident with the composition and parallel to the ordinate and the intersection with the curved line extending from 1234° C. to 522° C. (this curved line being the solubility curve of CdSe in $CdCl_2$).

At each composition and temperature line intersection, point $b$ for example, a line parallel to the abscissa (line $abc$) intersects the CdSe pure composition line (at a point $a$) and the boundary between the liquid, vapor and solid CdSe, liquid-vapor regions (at point $c$) can be used to determine the fraction of the CdSe which is in the dissolved state. The left arm of such a line (the arm $ab$) divided by the length of both arms $(ab+bc)$ is the fraction of CdSe present in the liquid phase.

If it is desired to effect approximately a 20% solution of the selenide at 535° C., an initial mixture containing approximately 10 mole percent $CdCl_2$ is added. When such a mixture is heated to 535° C., the $CdCl_2$ will be volatilizing at a rapid rate and the composition of the system will shift toward pure CdSe. The net result, of course, is that the amount of liquid phase will decrease and as a consequence of this, the amount of sintering that will occur in a given time interval at 535° C. will decrease. After a certain elapse of time, in fact, all of the $CdCl_2$, will have volatilized and to all intents and purposes sintering will terminate. In order to take into account this loss of $CdCl_2$, the initial quantity of $CdCl_2$ may be increased, but this is practical only for a short range of compositions since the desired end product is sintered CdSe in a continuous layer. If too large a quantity of flux is employed the desired material will be diluted to an extent such that the resulting layer is thin and discontinuous. For practical considerations a range of from approximately 5-20 mole percent of flux is generally useful. It is evident that as sintering is effected at higher and higher temperatures, the problem of flux volatilization increases with temperature. It is evident from the above therefore, that the preparation of a controlled uniform sintered layer in a volatile flux system is difficult to achieve if no measures are employed to control flux volatilization during the sintering process. For practical considerations, it is desirable to effect sintering at as low a temperature as possible so as to minimize contamination of the sintering material. The lowest practical temperatures are in the vicinity of the eutectic melting temperature, for example, 522° C. for CdSe fluxed with $CdCl_2$. For a given system containing a specified quantity of flux and a specified quantity of material to be sintered, when precautions are taken to retain approximately the initial concentrations of flux during the sintering cycle, the amount of grain growth that occurs is dependent on the temperature of the sintering cycle and the length of time sintering occurs in the presence of a liquid phase. Thus, to form sintered layers of CdSe using $CdCl_2$ as a flux such that ultimate grain size is approximately 8 microns, a 1 micron powder is heated for approximately 20 minutes at 535° C. in a system containing 10 mole percent of flux. For this same starting composition and a sintering temperature of 575° C. only 10 minutes are required.

The above considerations are primarily concerned with effecting desired degrees of sintering. In the preparation of a photoconductor sintered layer as for example the fabrication of a CdSe sintered layer, the final electrical properties must be considered. These properties are to a considerable degree dependent on the vacancy concentration of each of the elements, Cd and Se in the lattice and more particularly with the excess of Se vacancies over Cd vacancies since CdSe is an "n" type semiconductor. At each temperature in the sintering cycle the number of such excess vacancies varies, the number decreasing with decreasing temperature. A final fabricated CdSe photoconductor element will when prepared at elevated temperatures have a much larger excess of Se vacancies than is thermodynamically required at room temperature and consequently if in the fabrication process no precautions are taken to back fill these vacancies the resulting sintered layer will be metastable at room temperature relative to its vacancy content. Such metastability manifests itself by making the fabricated device unstable since it will tend to absorb oxygen to fill in the excess Se vacancies. Such a device will also exhibit poor dark conductivity because the large number of excess metastable Se vacancies are uncompensated. Oxygen may be utilized to back fill the excess Se vacancies during the sintering process by conducting the sintering cycle in an oxygen-nitrogen atmosphere such that back filling occurs automatically during the sintering cycle resulting in a stable compensated device. The range of oxygen-nitrogen composition must be restricted in order to prevent formation of appreciable quantities of a second phase of Cd on the surface of the sintered layer. The formation of such a second phase will result in photoconductors exhibiting unacceptable electrical scatter, especially in multielement devices and will also result in photoconductors exhibiting nonlinear voltage-current characteristics present in a non-reproducible fashion and thus detract from the desired electrical properties of the photoconductor device.

The above discussion is equally applicable to sintering of CdS or solid solutions of CdS and CdSe using $CdCl_2$ as a flux or to sintering of CdSe, CdS or solid solutions of both with fluxes generally and more specifically with other useful fluxes such as $CdBr_2$ or $CdI_2$.

The process of the invention which involves control of flux partial vapor pressure can best be demonstrated in the context of a total sintering process for example, that employed in fabricating sintered photoconductor layers. An embodiment of the invention will be described using CdSe fluxed with $CdCl_2$ in a sintering cycle which represents one stage in a multistage fabrication process for sintered CdSe photoconductor layers.

A mixture of CdSe doped with Cu for example, and $CdCl_2$ with the latter constituting 5-20 mole percent of the total mixture is affixed to a suitable inert substrate such as for example glass, alumina, quartz, ceramic material, etc. The substrate and unsintered materials are heated in a 0.2-1.7% by volume of oxygen in an oxygen-nitrogen gas mixture to a temperature of 522° C.-600° C. for a period of 5-20 minutes at the peak temperature. The substrate with the unsintered materials are placed upon a volume restricting container such that the material to be sintered faces into the container. The volume of the container is chosen commensurate with the quantity of flux present in the unsintered materials such that only a small fraction of this quantity is required to fulfill the flux partial vapor pressure requirement at the sintering temperature. Alternately, the flux, $CdCl_2$, is fused in a thin layer at the bottom of the container to provide an independent source of flux partial pressure. Alternately a bed of chromatographic grade $Al_2O_3$ or other inert finely divided material such as, for example, $SiO_2$ etc. is superimposed upon the fused thin flux layer at the bottom of the container so as to enable control of the rate of flux evaporation from the source bed. Alternately a mixture similar in composition to that being sintered is fused at the bottom of the container and covered with a powder of $Al_2O_3$ or other inert material. Alternately an unfused layer of either $CdCl_2$ or mixture similar in composition to that being sintered is placed in the bottom of the container and either left uncovered or covered by a bed of powdered $Al_2O_3$ or other suitable inert material.

The control of the flux partial vapor pressure at the sintering temperature in the fabrication process for photoconductors is achieved in such a manner that it is self-adjusting or automatic. The various methods by which the flux partial vapor pressure is self-controlled or self-adjusting are as follows:

(1) The flux cadmium chloride is fused in a thin layer at the bottom of the container to provide an independent source of flux partial vapor pressure.

(2) A bed of chromatographic grade aluminum oxide ($Al_2O_3$) or other inert finely divided material is superimposed on the fused thin flux layer at the bottom of the container so as to enable control of the rate of flux evaporation from the source bed (molecular sieve).

(3) A mixture similar in composition to that being sintered is fused at the bottom of the container and covered with a white powder of $Al_2O_3$ or other inert material (restrict volume to prevent loss to ambient atmosphere).

(4) An unfused layer of thin cadmium chloride or mixture similar in composition to that being sintered is placed in the bottom of the container and either uncovered or covered by a bed of powdered $Al_2O_3$ or other suitable inert material.

Figure 3:
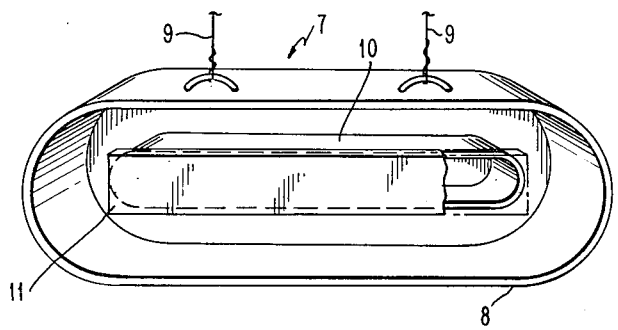
FIGURE 3 is an enlarged perspective view of one of the sample carriers of the apparatus.
Figure 2:
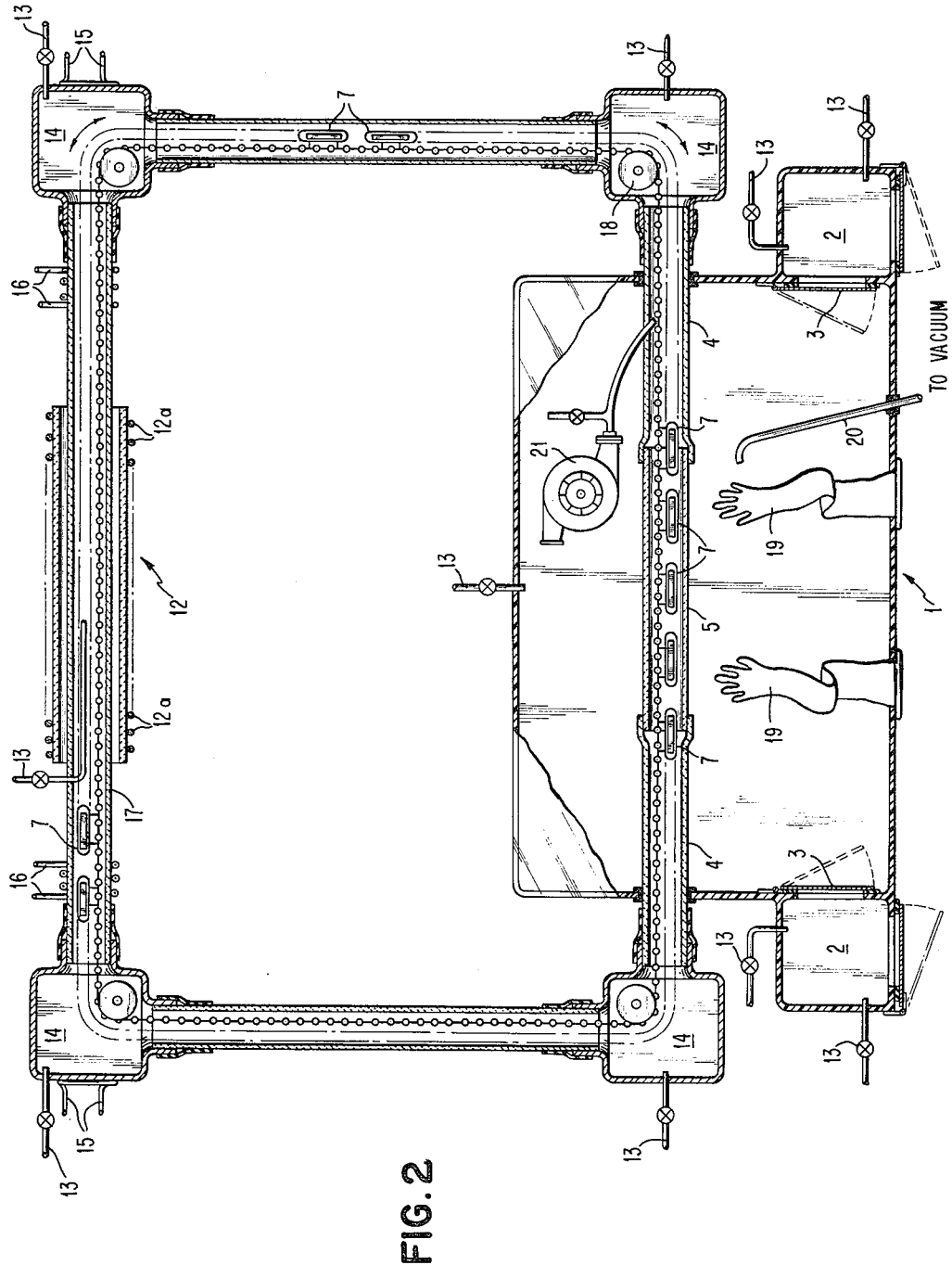
FIGURE 2 is a top sectional view of apparatus used in the process of the invention.

The apparatus in which the process of the invention may be carried out is shown in FIGURE 2. It consists of an airtight glove box 1 to which are affixed gas locks 2 to permit access to the glove box via lock doors 3 without affecting the atmosphere. Passing through the glove box via a quartz tube 4 which is opened in its center 5 is an endless chain 6 to which are attached sample carriers 7. The latter are shown in detail in FIGURE 3. The sample carriers are seen to consist of two nested boats. The outer of these 8 is simply the carrier which is attached to the continuous chain by wire hooks 9. The inner boat 10 is actually the sample holder. The substrate 11 is inverted over the inner boat and it is seen from FIGURE 3 that a semi-tight seal is formed between the inner boat (the volume restricting or flux pressure adjusting chamber) and the substrate. These sample carriers fill the entire length of the continuous chain so as to set up steady state heat conditions in the furnace 12 in which there are heating coils 12a of FIGURE 2. The entire controlled atmosphere apparatus is valved 13 to permit equalization of gas flow into and out of the apparatus. The corner boxes 14, are water cooled by condenser coils 15 as are the connections 16 between these corner boxes and the furnace tube 17. The continuous chain is traversed via a variable speed pulley 18 to enable traverse rates of from .1–4″/minute. Operating access to the glove box is via gloves 19 although loading and unloading of the samples is effected with a vacuum pickup 20. Atmosphere circulation within the apparatus is effected with a circulating pump 21.

EXAMPLE 1

(CdSe fluxed with $CdCl_2$)

.035 g. of CbSe are admixed with .0016 g. of $CdCl_2$ and $3.5 \times 10^{-3}$ mg. of Cu added as $CuCl_2$ and affixed to a glass substrate in 7 rectangular shapes of equal surface area in a conventional manner. This slide is placed face down on a container having a volume of 1½ cubic inches such that the entire area of the substrate upon which material to be sintered is located faces into the interior of the container. The container and substrate are drawn into a furnace having a peak temperature of 522° C. over a length three times the substrate length in which a .2% $O_2$–99.8% $N_2$ atmosphere is maintained. The sintering is effected for 20 minutes. The sintered layers are cooled, washed with water to remove remaining flux and electroded. Grain size of the sintered layers are approximately 6 microns in size. The particle size of the unsintered CdSe prior to the processing is less than 1 micron.

The electrical properties of layers processed in the same way each time are reproducible. These electroded sintered layer photoconductors are useful as active elements in computor logic circuits.

EXAMPLES 2–48

(CdSe fluxed with $CdCl_2$)

The procedure of Example 1 is repeated except the conditions or parameters of the process are varied as indicated in Table I with the corresponding result set forth.

Table I

| Example No. | Photo-conductor material | Flux | Weight of photo-conductor material (grams) | Weight of flux (grams) | Temperature (° C.) | Sintering time at peak temperature (minutes) | Composition of ambient atmosphere | Starting particle size (microns) | Final sintered particle size (microns) |
|---|---|---|---|---|---|---|---|---|---|
| 2 | CdSe | $CdCl_2$ | 0.035 | 0.0016 | 522 | 20 | 0.5% $O_2$, 99.5% $N_2$ | 1 | 6 |
| 3 | CdSe | $CdCl_2$ | 0.035 | 0.0016 | 522 | 20 | 1.0% $O_2$, 99.0% $N_2$ | 1 | 6 |
| 4 | CdSe | $CdCl_2$ | 0.035 | 0.0016 | 522 | 20 | 1.7% $O_2$, 98.3% $N_2$ | 1 | 6 |
| 5 | CdSe | $CdCl_2$ | 0.035 | 0.0016 | 535 | 15 | 0.2% $O_2$, 99.8% $N_2$ | 1 | 6 |
| 6 | CdSe | $CdCl_2$ | 0.035 | 0.0016 | 535 | 15 | 0.5% $O_2$, 99.5% $N_2$ | 1 | 6 |
| 7 | CdSe | $CdCl_2$ | 0.035 | 0.0016 | 535 | 15 | 1.0% $O_2$, 99.0% $N_2$ | 1 | 6 |
| 8 | CdSe | $CdCl_2$ | 0.035 | 0.0016 | 535 | 15 | 1.7% $O_2$, 98.3% $N_2$ | 1 | 6 |
| 9 | CdSe | $CdCl_2$ | 0.035 | 0.0016 | 575 | 10 | 0.2% $O_2$, 99.8% $N_2$ | 1 | 6 |
| 10 | CdSe | $CdCl_2$ | 0.035 | 0.0016 | 575 | 10 | 0.5% $O_2$, 99.5% $N_2$ | 1 | 6 |
| 11 | CdSe | $CdCl_2$ | 0.035 | 0.0016 | 575 | 10 | 1.0% $O_2$, 99.0% $N_2$ | 1 | 6 |
| 12 | CdSe | $CdCl_2$ | 0.035 | 0.0016 | 575 | 10 | 1.7% $O_2$, 98.3% $N_2$ | 1 | 6 |
| 13 | CdSe | $CdCl_2$ | 0.035 | 0.0016 | 600 | 5 | 0.2% $O_2$, 99.8% $N_2$ | 1 | 6 |
| 14 | CdSe | $CdCl_2$ | 0.035 | 0.0016 | 600 | 5 | 0.5% $O_2$, 99.5% $N_2$ | 1 | 6 |
| 15 | CdSe | $CdCl_2$ | 0.035 | 0.0016 | 600 | 5 | 1.0% $O_2$, 99.0% $N_2$ | 1 | 6 |
| 16 | CdSe | $CdCl_2$ | 0.035 | 0.0016 | 600 | 5 | 1.7% $O_2$, 98.3% $N_2$ | 1 | 6 |
| 17 | CdSe | $CdCl_2$ | 0.035 | 0.0037 | 522 | 20 | 0.2% $O_2$, 99.8% $N_2$ | 1 | 8 |
| 18 | CdSe | $CdCl_2$ | 0.035 | 0.0037 | 522 | 20 | 0.5% $O_2$, 99.5% $N_2$ | 1 | 8 |
| 19 | CdSe | $CdCl_2$ | 0.035 | 0.0037 | 522 | 20 | 1.0% $O_2$, 99.0% $N_2$ | 1 | 8 |
| 20 | CdSe | $CdCl_2$ | 0.035 | 0.0037 | 522 | 20 | 1.7% $O_2$, 98.3% $N_2$ | 1 | 8 |
| 21 | CdSe | $CdCl_2$ | 0.035 | 0.0037 | 535 | 15 | 0.2% $O_2$, 99.8% $N_2$ | 1 | 8 |
| 22 | CdSe | $CdCl_2$ | 0.035 | 0.0037 | 535 | 15 | 0.5% $O_2$, 99.5% $N_2$ | 1 | 8 |
| 23 | CdSe | $CdCl_2$ | 0.035 | 0.0037 | 535 | 15 | 1.0% $O_2$, 99.0% $N_2$ | 1 | 8 |

Table I—Continued

| Example No. | Photoconductor material | Flux | Weight of photoconductor material (grams) | Weight of flux (grams) | Temperature (° C.) | Sintering time at peak temperature (minutes) | Composition of ambient atmosphere | Starting particle size (microns) | Final sintered particle size (microns) |
|---|---|---|---|---|---|---|---|---|---|
| 24 | CdSe | CdCl₂ | 0.035 | 0.0037 | 535 | 15 | 1.7% O₂, 98.3% N₂ | 1 | 8 |
| 25 | CdSe | CdCl₂ | 0.035 | 0.0037 | 575 | 10 | 0.2% O₂, 99.8% N₂ | 1 | 8 |
| 26 | CdSe | CdCl₂ | 0.035 | 0.0037 | 575 | 10 | 0.5% O₂, 99.5% N₂ | 1 | 8 |
| 27 | CdSe | CdCl₂ | 0.035 | 0.0037 | 575 | 10 | 1.0% O₂, 99.0% N₂ | 1 | 8 |
| 28 | CdSe | CdCl₂ | 0.035 | 0.0037 | 575 | 10 | 1.7% O₂, 98.3% N₂ | 1 | 8 |
| 29 | CdSe | CdCl₂ | 0.035 | 0.0037 | 600 | 5 | 0.2% O₂, 99.8% N₂ | 1 | 8 |
| 30 | CdSe | CdCl₂ | 0.035 | 0.0037 | 600 | 5 | 0.5% O₂, 99.5% N₂ | 1 | 8 |
| 31 | CdSe | CdCl₂ | 0.035 | 0.0037 | 600 | 5 | 1.0% O₂, 99.0% N₂ | 1 | 8 |
| 32 | CdSe | CdCl₂ | 0.035 | 0.0037 | 600 | 5 | 1.7% O₂, 98.3% N₂ | 1 | 8 |
| 33 | CdSe | CdCl₂ | 0.035 | 0.0084 | 522 | 20 | 0.2% O₂, 99.8% N₂ | 1 | 10 |
| 34 | CdSe | CdCl₂ | 0.035 | 0.0084 | 522 | 20 | 0.5% O₂, 99.5% N₂ | 1 | 10 |
| 35 | CdSe | CdCl₂ | 0.035 | 0.0084 | 522 | 20 | 1.0% O₂, 99.0% N₂ | 1 | 10 |
| 36 | CdSe | CdCl₂ | 0.035 | 0.0084 | 522 | 20 | 1.7% O₂, 98.3% N₂ | 1 | 10 |
| 37 | CdSe | CdCl₂ | 0.035 | 0.0084 | 535 | 15 | 0.2% O₂, 99.8% N₂ | 1 | 10 |
| 38 | CdSe | CdCl₂ | 0.035 | 0.0084 | 535 | 15 | 0.5% O₂, 99.5% N₂ | 1 | 10 |
| 39 | CdSe | CdCl₂ | 0.035 | 0.0084 | 535 | 15 | 1.0% O₂, 99.0% N₂ | 1 | 10 |
| 40 | CdSe | CdCl₂ | 0.035 | 0.0084 | 535 | 15 | 1.7% O₂, 98.3% N₂ | 1 | 10 |
| 41 | CdSe | CdCl₂ | 0.035 | 0.0084 | 575 | 10 | 0.2% O₂, 99.8% N₂ | 1 | 10 |
| 42 | CdSe | CdCl₂ | 0.035 | 0.0084 | 575 | 10 | 0.5% O₂, 99.5% N₂ | 1 | 10 |
| 43 | CdSe | CdCl₂ | 0.035 | 0.0084 | 575 | 10 | 1.0% O₂, 99.0% N₂ | 1 | 10 |
| 44 | CdSe | CdCl₂ | 0.035 | 0.0084 | 575 | 10 | 1.7% O₂, 98.3% N₂ | 1 | 10 |
| 45 | CdSe | CdCl₂ | 0.035 | 0.0084 | 600 | 5 | 0.2% O₂, 99.8% N₂ | 1 | 10 |
| 46 | CdSe | CdCl₂ | 0.035 | 0.0084 | 600 | 5 | 0.5% O₂, 99.5% N₂ | 1 | 10 |
| 47 | CdSe | CdCl₂ | 0.035 | 0.0084 | 600 | 5 | 1.0% O₂, 99.0% N₂ | 1 | 10 |
| 48 | CdSe | CdCl₂ | 0.035 | 0.0084 | 600 | 5 | 1.7% O₂, 98.3% N₂ | 1 | 10 |

EXAMPLE 49

(CdSe fluxed with $CdBr_2$)

The processes of Examples 1–48 are repeated using $CdBr_2$ as the flux. The eutectic temperature for this system, $CdBr_2$—CdSe, is 527° C. The useful range for sintering is 527°–600° C. for 5 to 20 minutes and a useful flux content range is 5–20 mole percent $CdBr_2$.

In order to achieve 6 micron sintered particles for a 5% flux content at all of the $O_2$—$N_2$ ambient atmosphere compositions set forth in Examples 1–48, the sample is heated for 20 minutes at 527° C., 15 minutes at 535° C., 10 minutes at 575° C. and 5 minutes at 600° C. A 10% flux content with the same temperatures and sintering times yields an 8 micron particle size and for a 20% flux content using the same sintering temperatures and times, a 10 micron particle size is obtained.

EXAMPLE 50

(CdSe fluxed with $CdI_2$)

The processes of Examples 1–48 are again repeated using $CdI_2$ as the flux. The eutectic temperature in this system, $CdI_2$—CdSe, is 370° C. The useful sintering range is 370°–500° C. for 30 minutes to 2 hours, and a useful flux content range is 5–20 mole percent $CdI_2$.

For a 5 mole percent flux content at all $O_2$—$N_2$ ambient atmosphere compositions shown in Examples 1–48, a 4 micron size is obtained when sintering is effected for 2 hours at 370° C., 1 hour at 450° C. and 30 minutes at 500° C. For these same sintering times and temperatures a 6 micron particle size is achieved with a flux content of 10 mole percent $CdI_2$ and an 8 micron particle size is achieved with a flux content of 20 mole percent $CdI_2$.

EXAMPLE 51

(CdS fluxed with $CdCl_2$)

The process of Examples 1–48 was repeated except CdS was used in place of CdSe and the conditions were changed as indicated below. The eutectic temperature of the system, CdS—$CdCl_2$, is 540° C. The useful sintering range is 540°–600° C. for 5 to 15 minutes. When .035 gram of CdS and 5, 10, or 20 mole percent of the flux relative to this quantity of CdS (.0024 g., .0049 g. and .0112 g. respectively) are heated at 540° C. and 600° C., the following relationship between particle size, sintering time and sintering temperature was obtained:

For 5 mol percent flux content, 15 minutes at 540° C. or 5 minutes at 600° C. yielded a 6 micron particle size at all the $O_2$—$N_2$ ambient atmosphere concentrations (.2% $O_2$–99.8% $N_2$, .5% $O_2$–99.5% $N_2$, 1.0% $O_2$–99.0% $N_2$ and 1.7% $O_2$–98.3% $N_2$) of Examples 1–48.

At 10 mole percent flux content with the same temperatures and times, etc., an 8 micron particle size was obtained, and at 20 mole percent flux content, a 10 micron particle size.

EXAMPLE 52

(CdS fluxed with $CdBr_2$)

The process of Example 49 was repeated except that CdS was used in place of CdSe and the conditions were changed as indicated below. The eutectic temperature in the system, CdS—$CdBr_2$, is 548° C. The useful sintering range is 548° C.–600° C. for 5 to 15 minutes respectively. The useful $CdBr_2$ flux range is 5–20 mole percent.

5 mole percent $CdBr_2$ flux at 548° C. for 15 minutes or 600° C. for 5 minutes yields a particle size of 6 microns. For 10 mole percent $CdBr_2$ flux at the same temperatures for the same time, an 8 micron sintered particle size is obtained for and 20 mole percent $CdBr_2$ flux content, a 10 micron sintered particle size. All of these particle sizes are independent of the $O_2$—$N_2$ ambient atmosphere concentrations shown in Example 49.

EXAMPLE 53

(CdS fluxed with $CdI_2$)

The process of Example 50 was repeated except that CdS was used in place of CdSe and the conditions were changed as indicated below. The eutectic temperature in the system, CdS—$CdI_2$, is 380° C. with a useful sintering range of 380°–500° C. and a time range of 30 minutes–2 hours. For .035 g. of CdS with flux contents of 5, 10 and 20 mole percent, the following relationship between particle size, sintering time and sintering temperature was obtained.

For 5 mole percent flux, 2 hours at 380° C. or 30 minutes at 500° C. yielded a 4 micron sintered particle size at all $O_2$—$N_2$ concentrations shown in Example 50. At 10 mole percent flux, 2 hours at 380° C. and 30 minutes at 500° C. yielded a 6 micron particle size, and at 20 mole percent flux for the same temperatures and times, an 8 micron sintered particle size.

In the previous Examples 1–53, flux partial pressure was more easily controlled since the photoconductor material to be sintered contained sufficient flux for both the back pressure and the sintering itself. The following examples illustrate the other methods which may be used to control the flux partial pressure and make it also self-adjusting in the situations where there is not sufficient flux in the photoconductor material to be sintered to provide both back pressure and the sintering requirements. Thus, when sample containers of the same volume as those used in Examples 1–53 are employed, but with smaller quantities of potoconductor material and therefore smaller quantities of flux, secondary flux control sources are provided in order to obtain effective sintering.

EXAMPLE 54

The processes of Examples 1–48 were repeated except that 0.018 g. CdSe were used. This CdSe was mixed with $CdCl_2$ so that the resulting mixture contained 10 mole percent $CdCl_2$ by weight. The mixture was affixed to a glass substrate in 7 rectangular shapes of equal surface area. The slide is placed face down on a container having a volume of 1½ cubic inches such that the entire area of the substrate upon which the material to be sintered is located faces into the interior of the container. In the bottom of this container, 1 g. of $CdCl_2$ had been fused. This container was then subjected to ambient atmosphere compositions, and the temperatures for the time intervals given in Examples 1–48. A uniform particle size of 10 microns was obtained as compared with a particle size of 1 micron for the starting material.

The same quantity of CdSe with either 5 or 20 mole percent $CdCl_2$ subjected to the same conditions yielded a particle size of 10 microns. CdSe fluxed with $CdBr_2$ or $CdI_2$ in amounts of 5, 10 or 20 mole percent when subjected to the same conditions yielded a particle size of 10 microns also as contrasted with particle size of 1 micron for starting material.

EXAMPLE 55

The processes of Examples 51–53 were repeated except .018 g. of CdS was used and 1 g. of the appropriate flux ($CdCl_2$ or $CdBr_2$ or $CdI_2$) was fused in the bottom of the container. When the same temperatures, time intervals, flux concentration, ambient atmosphere compositions etc. of Examples 51–53 were applied, the process yielded a sintered photoconductor material having a particle size of 10 microns.

EXAMPLE 56

The processes of Examples 1–50 are repeated except that 0.009 g. of CdSe are used and 1 g. of the appropriate flux is fused in the bottom of the sample container and covered by a ¼″ bed of $Al_2O_3$ of 200 mesh size (U.S. Standard Sieve). At all the appropriate ambient atmosphere, temperature, time and flux content parameters of these examples a 10 micron particle size was achieved.

EXAMPLE 57

The processes of Examples 51–53 are repeated except that 0.009 g. of CdS are used and 1 g. of the appropriate flux is fused in the bottom of the sample container and covered by a ¼″ bed of $Al_2O_3$ of 200 mesh size (U.S. Standard Sieve). At all the appropriate ambient atmosphere, temperature, time and flux content parameters of these examples a 10 micron particle size was achieved.

EXAMPLE 58

The processes of Examples 1–50 are repeated except that 0.009 g. of CdSe was used and 1 g. of a mixture having the identical composition as the sintering mixture was fused at the bottom of the sample container and covered by a ¼″ bed of 200 mesh $Al_2O_3$. At all the appropriate ambient atmosphere, temperature, time and flux content parameters of these specific examples a 10 micron particle size was achieved.

EXAMPLE 59

The processes of Examples 51–53 are repeated except that 0.009 g. of CdS was used and 1 g. of a mixture having the identical composition as the sintering mixture was fused at the bottom of the sample container and covered by a ¼″ bed of 200 mesh $Al_2O_3$. At all the appropriate ambient atmosphere, temperature, time and flux content parameters of these specific examples a 10 micron particle size was achieved.

EXAMPLE 60

The processes of Examples 1–50 were repeated except that .035 g. of CdSe are used and 1 g. of the particular flux mixed with the CdSe is fused in the bottom of the sample container. At all the appropriate ambient atmosphere, temperature, time and flux content parameters of these examples a 20 micron particle size was obtained. If the fused flux beds were covered by ¼″ 200 mesh $Al_2O_3$, a particle size of 15 microns was obtained.

EXAMPLE 61

The processes of Examples 51–53 were repeated except that .035 g. of CdS are used and 1 g. of the particular flux mixed with the CdS is fused in the bottom of the sample container. At all the appropriate ambient atmosphere, temperature, time and flux content parameters of these examples a 20 micron particle size was obtained. If the fused flux beds were covered by ¼″ 200 mesh $Al_2O_3$, a particle size of 15 microns was obtained.

EXAMPLE 62

The processes of Examples 54–61 are repeated except that the flux material in the bottom of the sample container is not fused, but is present as 200 mesh (U.S. Standard Sieve) powders. In those examples where the flux beds are not covered by $Al_2O_3$ a particle size 10 microns larger than particle size of the specific example was obtained. If the flux beds are covered by a ¼″ 200 mesh $Al_2O_3$ bed then the particle size is 5 microns larger than the particle size of the specific example.

EXAMPLE 63

The processes of Examples 1–62 are repeated except that solid solutions of CdSe and CdS are used in place of CdSe or CdS. All the other parameters of the process remain the same. The particle size achieved is the same as that obtained for the CdSe or CdS sintered photoconductor layers.

The process of the invention describes methods for controlling the partial pressure of flux used during the sintering cycle of photoconductor materials as well as the effective temperature and time parameters for several fluxes and photoconductor materials. It also sets forth a method of preparing compensated photoconductors using a oxygen-nitrogen ambient sintering atmosphere without the formation of a surface oxide phase that would yield non-ohmic devices.

While the invention has been particularly shown and described with reference to preferred embodiments thereof, it will be understood by those skilled in the art that various changes in form and details may be made therein without departing from the spirit and scope of the invention.

What is claimed is:

1. A process for controlling flux concentration in a sintering mixture comprising the material to be sintered plus a volatile flux, volatile at temperatures during which a sintering process is to be effected, which process comprises regulating the flux vapor pressure in the ambient atmosphere over the sintering mixture during heating at all temperatures involved in the sintering cycle so that the flux concentration in the sintering mixture is maintained at approximately its initial concentration during the entire sintering cycle.

2. A process for controlling flux concentration in a sintering mixture comprising the material to be sintered plus a volatile flux, volatile at temperatures during which a sintering process is to be effected, which process comprises restricting the volume in which sintering is to be effected so that the flux partial pressure requirement of that volume is attained without depleting the flux concentration in the sintering mixture appreciably below its initial concentration during the entire sintering cycle.

3. A process for controlling flux concentration in a sintering mixture comprising the material to be sintered plus a volatile flux, volatile at temperatures during which a sintering process is to be effected, which comprises fulfilling the flux partial pressure requirements in the sample container from a bed of flux material rather than from the sintering mixture so that the flux concentration in the sintering mixture is maintained at approximately its initial concentration during the entire sintering cycle.

4. A process for controlling flux concentration in a sintering mixture comprising the material to be sintered plus a volatile flux, volatile at temperatures during which a sintering process is to be effected, which process comprises fulfilling the flux partial pressure requirements in the sample container, from a bed of flux material overlaid with inert material composed of small particles through which the flux vapor can diffuse in a regulated manner rather than from the sintering mixture so that flux concentration in the sintering mixture is maintained at approximately its initial concentration during entire sintering cycle.

5. A process for controlling flux concentration in a sintering mixture comprising the material to be sintered plus a volatile flux, volatile at temperatures during which a sintering temperature is to be effected, which process comprises fulfilling flux partial pressure requirements in the sample container from a separate source of flux in a bed composed of flux plus material to be sintered which has a vapor pressure equal to that of the flux in the sintering mixture rather than from the sintering mixture that the flux concentration in the sintering mixture is maintained at approximately its initial concentration during the entire sintering cycle.

6. A process for controlling flux concentration in a sintering mixture comprising the material to be sintered plus a volatile flux, volatile at temperatures during which a sintering process is to be effected, which process comprises fulfilling flux partial pressure requirements in sample container from a bed of finely divided flux overlaid with inert material composed of small particles through which flux vapor can diffuse in regulated manner rather than from the sintering mixture so that flux concentration in the sintering mixture is maintained at approximately its initial concentration during the entire sintering cycle.

7. A process for controlling flux concentration in a sintering mixture comprising the material plus a volatile flux, volatile at temperatures during which a sintering temperature is to be effected, which process comprises fulfilling flux partial pressure requirements in sample container from a bed of finely divided flux rather than from the sintering mixture so that flux concentration in the sintering material is maintained at approximately its initial concentration during the entire sintering cycle.

8. A process for controlling flux concentration in a sintering mixture comprising the material to be sintered plus a volatile flux, volatile at temperatures during which a sintering process is to be effected, which process comprises fulfilling flux partial pressure requirements in sample container from a bed of fused flux overlaid with inert material composed of small particles through which the flux vapor can diffuse in regulated manner rather than from the sintering mixture so that the flux concentration in the sintering mixture is maintained at approximately its initial concentration during the entire sintering cycle.

9. The process of claim 1 in which the material to be sintered is a photoconductor material selected from the group consisting of cadmium sulfide, cadmium selenide and solid solutions of cadmium sulfide and cadmium selenide.

10. The process of claim 1 in which the flux is selected from the group consisting of cadmium iodide, cadmium bromide and cadmium chloride.

11. A process for controlling the flux partial pressure during the fabrication of fluxed sintered layer photoconductors in a controlled gaseous ambient atmosphere which comprises regulating the flux partial pressure in the ambient atmosphere over a mixture of the sintering photoconductor material plus flux during the heat treatment at all temperatures involved in the sintering cycle so that the flux concentration of the sintering mixture is maintained at approximately its initial concentration during the entire sintering cycle.

12. A process for fabricating sintered layer photoconductors which comprises:
   (1) doping an unsintered photoconductor material by mixing an impurity with said unsintered photoconductor material;
   (2) mixing the doped material with a flux material;
   (3) affixing this mixture to a suitable inert substrate;
   (4) subjecting the substrate and the unsintered mixture affixed thereto to a sintering temperature cycle in an oxygen-nitrogen gas atmosphere for a time sufficient to accomplish grain growth to a desired size;
   (5) controlling the flux vapor pressure in the ambient atmosphere over the mixture of sintering photoconductor material plus flux during the heat treatment at all temperatures in the sintering cycle so that the flux concentration of the sintering mixture is maintained at approximately its initial concentration during the entire sintering cycle;
   (6) thereafter cooling.

13. A process for fabricating sintered layer photoconductors which comprises:
   (1) doping an unsintered photoconductor material by mixing an impurity with said unsintered photoconductor material;
   (2) mixing the doped unsintered photoconductor material with sufficient flux so that the flux will constitute 5 to 20 mole percent of the total mixture;
   (3) affixing this mixture to an inert substrate;
   (4) heating the substrate and the unsintered mixture in a 0.2% $O_2$, 99.8% $N_2$–1.7% $O_2$, 88.3% $N_2$ gas mixture to a temperature whose minimum value is determined by the eutectic temperature in flux-photoconductor system and whose maximum value is from 80°–150° C. above the eutectic temperature for time sufficient to accomplish grain growth to a desired particle size;
   (5) regulating the flux vapor pressure in the ambient atmosphere above the mixture of sintering photoconductor material plus flux during heat treatment at all temperatures in the sintered cycle so that a flux concentration is maintained at approximately its initial concentration during the entire sintering cycle;
   (6) and thereafter cooling.

14. The process of claim 13 in which the regulating of the flux vapor pressure in the ambient atmosphere is accomplished by selecting the volume of the container commensurate to the quantity of flux present in the sintering mixture such that only a small fraction of this flux concentration is required to fulfill the flux partial vapor pressure requirement at the sintering temperature and placing the substrate with the unsintered materials upon a volume restricting container such that the material to be sintered faces into the container.

15. The process of claim 13 whereby the flux vapor pressure in the ambient atmosphere is controlled by placing a fused layer of the flux at the bottom of the container to provide an independent source of flux partial vapor pressure.

16. The process of claim 13 in which the flux vapor pressure in the ambient atmosphere is controlled by placing a fused thin layer of flux material at the bottom of the sample container and covering this material with a bed of inert finely divided material so as to enable control of the flux evaporation rate from the fused layer.

17. The process of claim 13 in which the flux vapor pressure in the ambient atmosphere is controlled by placing a mixture similar in composition to that being sintered in the bottom of the container and fusing and then covering this fused mixture with an inert finely divided material so as to provide a vapor pressure equal to that of the flux in the sintering mixture.

18. The process of claim 13 in which the photoconductor material is a material selected from the group consisting of cadmium sulfide, cadmium selenide and solid solutions of cadmium sulfide and cadmium selenide.

19. The process of claim 18 in which the flux is selected from the group consisting of cadmium iodide, cadmium bromide and cadmium chloride.

No references cited.